United States Patent
Abe et al.

(10) Patent No.: US 6,212,872 B1
(45) Date of Patent: Apr. 10, 2001

(54) PRESSURIZED FLUIDIZED-BED COMBINED CYCLE POWER GENERATION SYSTEM

(75) Inventors: Katsuhiko Abe, Takasago; Makoto Kato, Nagasaki; Yoshinori Hyakutake; Satoshi Uchida, both of Tokyo; Yoshifumi Masuda; Fuminori Fujii, both of Takasago, all of (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/147,734
(22) PCT Filed: Jun. 29, 1998
(86) PCT No.: PCT/JP98/02899
   § 371 Date: Jul. 6, 1999
   § 102(e) Date: Jul. 6, 1999
(87) PCT Pub. No.: WO99/00586
   PCT Pub. Date: Jan. 7, 1999

(30) Foreign Application Priority Data

Jun. 27, 1997 (JP) .................................................. 9-171917

(51) Int. Cl.⁷ ................................. F02C 6/18; F02C 9/16
(52) U.S. Cl. ................. 60/39.182; 60/39.29; 60/39.464; 60/39.58
(58) Field of Search ............................ 60/39.182, 39.464, 60/39.29, 39.54, 39.58, 39.59

(56) References Cited

U.S. PATENT DOCUMENTS 5,918,466 * 7/1999 Cloyd et al. ...................... 60/39.464

FOREIGN PATENT DOCUMENTS 4-246244 * 9/1992 (JP).

* cited by examiner

Primary Examiner—Louis J. Casaregola
(74) Attorney, Agent, or Firm—Oblon, Spivak, McClelland, Maier & Neustadt, P.C.

(57) ABSTRACT

A pressurized fluidized bed combined electricity generation system for improving gas turbine output increases and prevention of surging is provided. This pressurized fluidized bed combined electricity generation system is a combined electricity generation system including a steam turbine; a pressurized fluidized bed boiler for generating steam for supply to the steam turbine by combusting air from an air supply system and fuel from a fuel supply system; a gas turbine driven by exhaust gas such as combustion gas from the pressurized fluidized bed boiler and the air; and a compressor directly coupled to the gas turbine. In addition, this pressurized fluidized bed combined electricity generation system has a first bypass duct communicating between the outlet side of the compressor and the exhaust gas side of the gas turbine and having a switching valve; a second bypass duct communicating between the outlet side of the compressor and the inlet side of the gas turbine and having a switching valve; and a control device which receives measured pressure values of a pressure detector which measures the pressure at the outlet of the compressor. This control device controls the switching valves of the first and second bypass ducts based on the relationship between the degree of opening of the inlet variable guide vane of the compressor which is determined in advance and a surge limiting pressure. A part of the steam generated by the pressurized fluidized bed boiler is extracted, mixed in with the exhaust gas or the above-mentioned air, and supplied to the gas turbine. Air from the compressor is supplied as fuel for the pressurized fluidized bed boiler.

5 Claims, 9 Drawing Sheets

- 1; PRESSURIZED FLUIDIZED BED BOILER
- 10; PRESSURIZED CONTAINER
- 11; BOILER
- 13; CYCLONE
- 14; DUST COLLECTING DEVICE
- 15; GAS TURBINE
- 16; COMPRESSOR
- 17; DENITRIFICATION DEVICE
- 18; HIGH PRESSURE EXHAUST HEAT RECOVERY/SUPPLY-WATER HEATER
- 19; LOW PRESSURE EXHAUST HEAT RECOVERY/SUPPLY-WATER HEATER
- 21; STEAM TURBINE
- 22; CONDENSER
- 23; LOW PRESSURE SUPPLY-WATER HEATER
- 25; DRUM
- 30; MAIN STEAM PIPE SYSTEM
- 31; REHEATING STEAM PIPE SYSTEM
- COLD WATER

PRESSURIZED FLUIDIZED-BED COMBINED CYCLE POWER GENERATION SYSTEM

BACKGROUND OF THE INVENTION

1. Field of the Invention

The present invention relates to a combined electricity generation system which combines two methods for generating electricity in which a steam turbine is driven by steam generated from a pressurized fluidized bed boiler and a gas turbine is driven using the exhaust gas from the boiler.

2. Description of the Related Art

Pressurized fluidized bed combined electricity generation systems are electricity generation systems which combine two methods such that electricity is generated by driving a steam turbine with steam generated from a fluidized bed boiler housed within a pressurized container, and electricity is generated by driving a gas turbine by introducing exhaust gas from the pressurized fluidized bed boiler into the gas turbine. For the combustion which occurs in the pressurized fluidized bed boiler, air for combustion is introduced into the boiler in a pressurized state from a compressor, crushed coal is added to the fluidized bed in which limestone forms the fluid medium, and combusted in a fluid state. A steam pipe is arranged within this fluidized bed, steam is generated due to the heat of combustion in the fluidized bed, the steam turbine is driven and electricity is generated. In addition, with this type of combustion, since limestone is used, it is possible to conduct desulferization within the furnace at the same time.

Further explaining the principle of the fluidized bed boiler mentioned above, an air dispersion plate is provided in the bottom of a container and solid particles are charged into the part above the air dispersion plate. Air is blown uniformly from the bottom of the air dispersion plate, and when the amount of air is increased, solid particles move vigorously and randomly within a layer of a certain height above the air dispersion plate. The solid particle layer which is floated and fluidized by a fluid in this way is referred to as a fluidized bed and the combustion in a fluid state of liquid fuel or solid fuel of a suitable size added to this fluidized bed is fluidized bed combustion.

Figure 9:
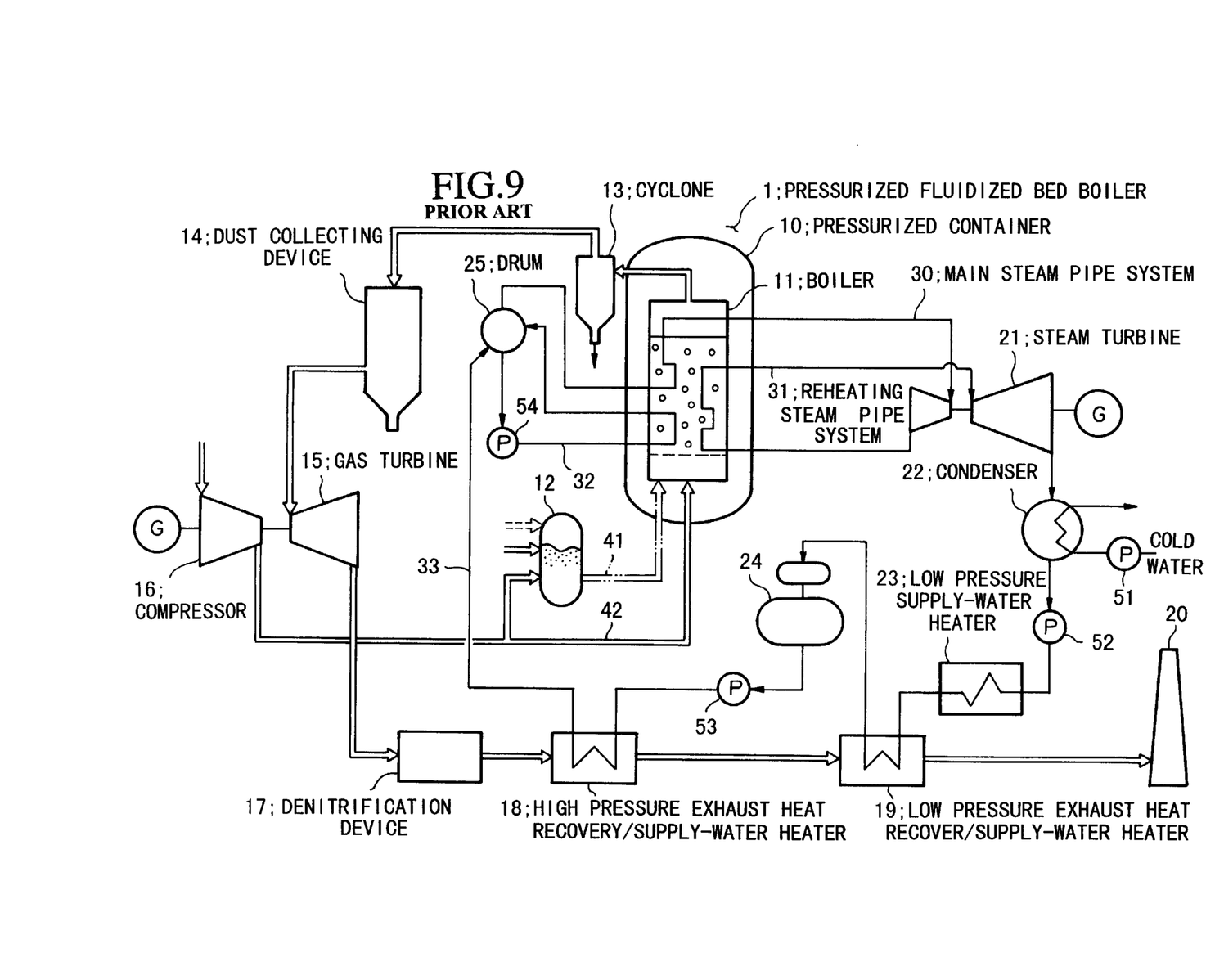
FIG. 9 is a schematic diagram showing a prior art example of a pressurized fluidized bed combined electricity generation system.

FIG. 9 is a schematic diagram showing an example of the pressurized fluidized bed combined electricity generation system explained above.

In FIG. 9, reference 1 indicates the entire pressurized fluidized bed boiler 1 comprises a pressurized container 10 and a boiler 11 therewithin. A coal/limestone supply device 12 supplies the limestone which forms the fluid medium and the coal starting materials to the boiler 11. A cyclone 13 removes particles which are noncombustible, and the like, from the exhaust gas from the boiler 11. A dust collecting device 14 comprises a ceramic filter, and ash and the like are filtered and removed by this ceramic filter. A gas turbine 15 is directly coupled to the compressor 16, is driven by high temperature exhaust gas from the dust collecting device 14. Also, there is a denitrification device 17, a high pressure exhaust heat recovery/supply-water heater 18 and a low pressure exhaust heat recover/supply-water heater 19. The high pressure exhaust heat recovery/supply-water heater 18 and the low pressure exhaust heat recover/supply-water heater 19 recover exhaust heat from the exhaust gas and preheat the water being supplied to the boiler 11 using this exhaust heat. A chimney 20 discharges the exhaust gas to the atmosphere.

In addition, in FIG. 9, there is a steam turbine 21 and a condenser 22 to which cold water is sent by a pump 51 and in which steam from the steam turbine 21 is cooled and condensed. A low pressure supply-water heater 23 heats the condensed water and regulates the temperature of the supply water. A deaerator 24 removes air bubbles from the supply water. A drum 25 supplies water to each of the pipes of boiler 11, that is, to main steam pipe system 30, reheating gas pipe system 31 and boiler circulation pipe system 32.

In the pressurized fluidized bed combined electricity generation system of the above-described structure, the limestone which is the fluidized bed medium and the coal starting material from the coal/limestone supply device 12 is sent to the boiler 11 by a supply system 41, while air from the compressor 16 is blown into the boiler 11 by an air system pipe 42, a fluidized bed is formed by this limestone and the coal is burned, thereby, fluidized bed combustion is carried out.

At the same time, supply water that has been heated in advance is supplied from the drum 25 to the main steam pipe system 30. The main steam pipe system 30 is heated by the boiler 11, steam is generated and the high pressure turbine of steam turbine 21 is driven. The steam discharged therefrom is returned to the boiler 11 again, it is reheated, run back into the steam turbine 21 a second time by the reheating steam pipe system 31, drives the low pressure turbine, and flows to the condenser 22. In addition, the supply water in the drum 25 circulates between the boiler 11 and the drum 25 by the boiler circulation pipe system 32 such that it is heated.

Next, large particles are removed by the cyclone 13, ash and the like are removed by the dust collecting device 14, then the combustion exhaust gas from the boiler 11 is supplied to the gas turbine 15, the turbine 15 is driven and electricity is generated. The exhaust gas which drives the gas turbine 15 is denitrified by the denitrification device 17. Then the remaining heat in the exhaust gas is used to heat the supply water being supplied to the boiler 11 by each of the high pressure exhaust heat recovery/supply-water heater 18 and the low pressure exhaust heat recover/supply-water heater 19. Thereafter, the exhaust gas is a discharged to the atmosphere from chimney 20.

The exhaust steam which drives the steam turbine 21 is condensed and liquefied by the condenser 22, to which cold water is sent by the pump 51 this condensed water is sent to the low pressure supply-water heater 23 by a pump 52 where it is heated and its temperature adjusted. Then it is preheated by exhaust gas in the low pressure exhaust heat recover/supply-water heater 19 and then is sent to a deaerator 24 and bubbles are removed. The supply water from the deaerator 24 is sent to the high pressure exhaust heat recovery/supply-water heater 18 by a pump 53 where it is preheated again and then sent to drum 25 by a pipe 33.

In the above-described pressurized fluidized bed combined electricity generation system, there is a combined cycle system which generates electricity by driving the steam turbine 21 and by the gas turbine 15 using the exhaust gas from the boiler 11, and it obtains high electricity generation efficiency. In addition, since the boiler 11 is housed inside the pressurized container 10, it can be made to be compact. In addition, since limestone is used as the fluid medium, desulferization can be carried out within the boiler 11, an exhaust gas desulferizer is not necessary, and it is possible to make the plant equipment area smaller compared with the past.

In the above-described pressurized fluidized bed combined electricity generation system, there is a combined cycle method in which a turbine is driven by steam generated by the pressurized fluidized bed boiler 1, the gas turbine 15 is driven by exhaust gas from the pressurized fluidized bed boiler 1, and it is possible to obtain high electricity generation efficiency. It is also possible to make the apparatus compact. In this type of system, the output of the gas turbine 15 is influenced by the characteristics of the fuel used (coal), the combustion method of the pressurized fluidized bed boiler 1 (combustion temperature, layer height), and the like, however, it depends greatly on the temperature of the intake air of the compressor 16 of the gas turbine 15 and the air-fuel ratio for combustion in the pressurized fluidized bed boiler 1.

The temperature of the intake air of the compressor 16 can be varied intentionally by operation using intake of air from indoors/outdoors, but it is basically determined by natural conditions. The air-fuel ratio in the combustion in the pressurized fluidized bed boiler 1 has a certain degree of freedom due to changes in the operating conditions of the pressurized fluidized bed boiler 1, but it is impossible to exceed the upper limit of the compressor 16. Under these types of conditions, it is possible, to some extent, to take measures to increase the output of the gas turbine 15 but, even in situations where the output of the gas turbine 15 is limited for some reason, for example, the temperature of the air drawn into the compressor 16 is higher than anticipated, there are cases (gas turbine certification output tests and the like) where it is necessary to increase the output of the gas turbine 15 beyond what is practically possible using present technology. In these types of situations, at present, it is not possible to cope with increasing output of the gas turbine 15.

In addition, in coal gasification combined electricity generation systems, in the same way, when there is, for some reason, a limitation to gas turbine output, there are cases (gas turbine certification output tests and the like) where it is necessary to increase the turbine output beyond what is possible using present technology, in these situations as well, increases in output beyond what can be responded to using present technology are impossible.

SUMMARY OF THE INVENTION

An object of the present invention is the provision of a pressurized fluidized bed combined electricity generation system which is a combined electricity generation system (such as a pressurized fluidized bed combined electricity generation system or a coal gasification combined electricity generation system) having a gas turbine and a steam turbine as the electricity generation devices, wherein, in addition to conventional measures such as varying the temperature of the intake air for the compressor and varying the air fuel ratio for the combustion in the boiler, it is possible to increase turbine output by changing the composition of the fuel gas introduced into the existing gas turbine.

In addition, the pressurized fluidized bed combined electricity generation system according to the present invention relates an improvement of surge prevention for the compressor when the load in the pressurized fluidized bed combined electricity generation system varies.

In more detail, in the above-mentioned pressurized fluidized bed combined electricity generation system, unlike usual systems, the compressor 16 which is directly coupled to the gas turbine 15 has the large capacity pressurized container 10 on the outlet side, therefore, variation in the pressure ratio with respect to variation in the quantity of intake air is slow. When the load decreases, since it is necessary to reduce the quantity of air for combustion within the pressurized container 10 in response to the amount of carbon supplied, the amount of air supplied to the pressurized container 10 from the compressor 16 must be decreased. At the time of this reduction in air, at a certain limiting pressure, the compressor 16 causes surging, but the surge limiting pressure ratio of this compressor 16 is simultaneously decreased along with the decrease in the quantity of air. However, even if the air flow rate is reduced, since there is the large capacity pressurized container 10 on the outlet side of the compressor 16, the operating pressure ratio does not decrease, and the earlier high pressure condition is maintained. As a result, as the air quantity is reduced, the pressure during operation reaches a surge limiting pressure threshold, and the compressor 16 surges.

Therefore, the present invention has as an object the provision of a pressurized fluidized bed combined electricity generation system plant in which, when the air quantity is reduced as described above, before the compressor begins to surge, a quantity of air from the compressor is made to bypass so that the pressure at the outlet side of the compressor does not reach the surge limiting pressure, and thus it is possible to avoid surging of the compressor.

In order to solve the above-described problem, the present invention provides a pressurized fluidized bed combined electricity generation system comprising a steam turbine; a pressurized fluidized bed boiler for combusting air from an air supply system and fuel from a fuel supply system and generating steam for supply to the steam turbine; and a gas turbine driven by exhaust gas comprising combustion gas from the pressurized fluidized bed boiler and the air; wherein, a part of the steam generated by the pressurized fluidized bed boiler is extracted and supplied to the gas turbine.

According to this pressurized fluidized bed combined electricity generation system, since the flow rate at the gas turbine inlet is increased by mixing steam having a large specific heat (among the gas characteristics at the gas turbine inlet) into the exhaust gas going to the gas turbine, it is possible to increase the output of the gas turbine.

In addition, the steam supplied to the gas turbine may be mixed into the exhaust gas and, since the flow rate at the inlet of the gas turbine increases, it is possible to increase the output of the gas turbine.

In addition, the steam supplied to the gas turbine can also be mixed in to the exhaust gas or the air supply system. Thus, since the steam is supplied to the gas turbine after being heated in the boiler, the temperature at the gas turbine inlet does not decrease and it is possible to increase the output of the gas turbine more effectively.

In addition, according to the pressurized fluidized bed combined electricity generation system of the present invention, it is possible, in a combined electricity generation system in which air from a compressor which is coupled directly to the gas turbine is supplied as fuel air for the pressurized fluidized bed boiler, to have a first bypass duct communicating between the outlet side of the compressor and the exhaust side of the gas turbine and having a switching valve; a second bypass duct communicating between the outlet side of the compressor and the inlet side of the gas turbine and having a switching valve; and a control device which receives measured pressure values from a pressure detector which measures the pressure at the outlet of the compressor, and the control device controls the switching valves of the first and second bypass ducts based on the relationship between the degree of opening of the inlet variable guide vane of the compressor which is determined in advance and a surge limiting pressure. Thus, when the pressure at the outlet of the compressor measured by the pressure detector exceeds the predetermined value, the control device maintains the degree of opening of the inlet variable guide vane, opens the switching valve of the first or second bypass duct, and allows a quantity of air flowing to the pressurized fluidized bed boiler to bypass in such a way as to prevent a pressure increase, thereby, it is possible to prevent surging of the compressor.

Here, two surge limiting pressure values are established in the control device in advance, and when the pressure during operation which is measured by the pressure detector reaches one of the surge limiting pressures, this control device is capable of controlling by maintaining the degree of opening of the inlet variable guide vane and opening the switching valves of the first bypass duct and, in addition, when the pressure reaches the other limiting pressure, it opens the switching valve of the second bypass duct, and this is suitable for preventing surging of the compressor.

Furthermore, in accordance with the temperature of the intake air for the compressor, it is possible for the control device to adjust the values of the two surge limiting pressures which are determined in advance, and adjusting the surge limiting pressure values changed according to the temperature of the intake air is even more suitable for preventing surging of the compressor.

BEST MODE FOR CARRYING OUT THE PRESENT INVENTION

In the following, an embodiment of the present invention will be explained in detail.

Figure 1:
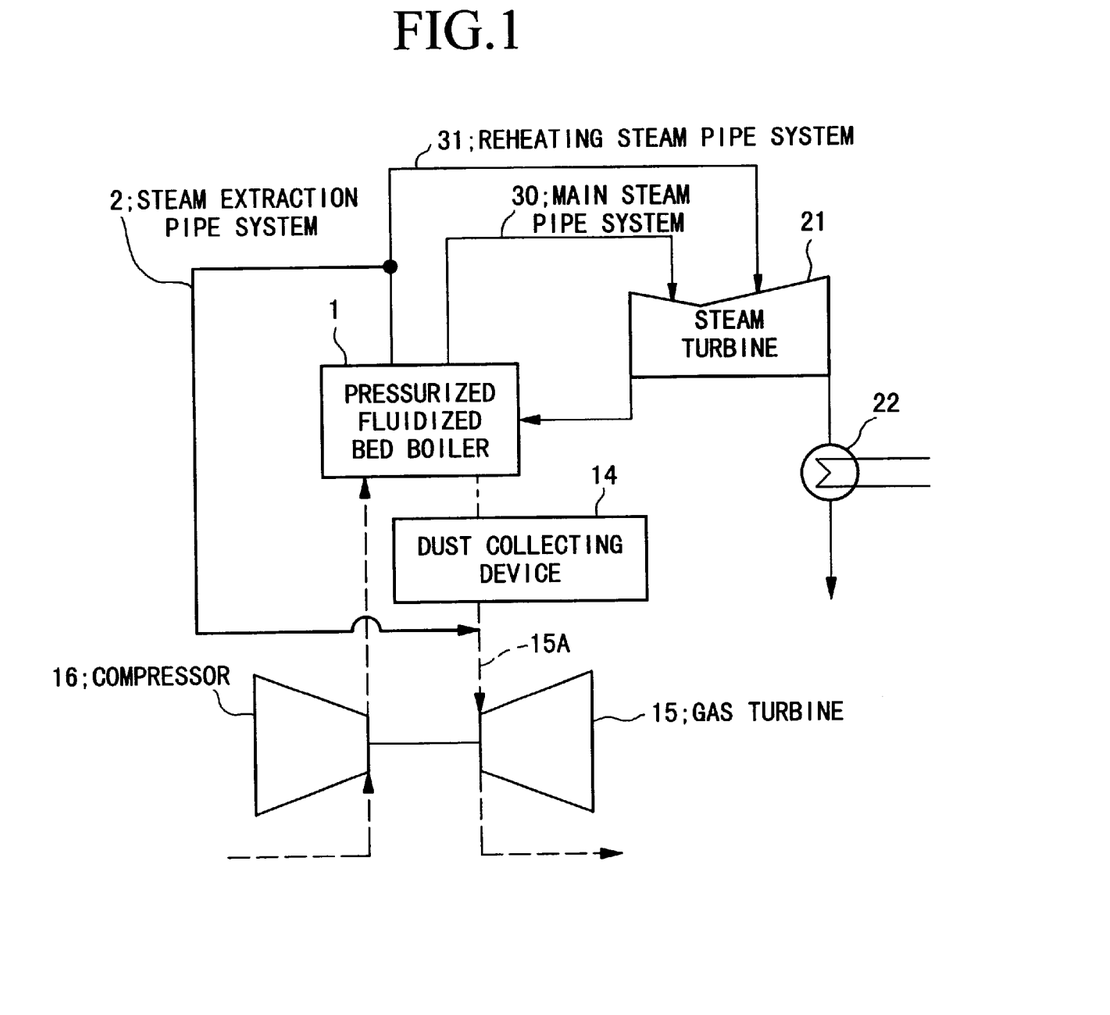
FIG. 1 is a schematic diagram of a combined electricity generation system according to a first embodiment of the present invention.

FIG. 1 is a schematic diagram of a combined electricity generation system according to a first embodiment of the present invention.

As shown in FIG. 1, the combined electricity generation system according to a first embodiment of the present invention comprises a pressurized fluidized bed boiler 1, a dust collecting device 14, a gas turbine 15, a compressor 16, a steam turbine 21, a condenser 22, a main steam pipe system 30; a reheating steam pipe system 31, and these structural elements have approximately the same structure as the structural elements having the same references as in the pressurized fluidized bed combined electricity generation system shown in the prior art of FIG. 9.

As shown in FIG. 1, the combined electricity generation system of the first embodiment has the feature of having a steam extraction pipe system 2.

As shown in FIG. 1, steam extraction pipe system 2 is provided in a condition connected between the reheating steam pipe system 31 and the outlet side of a secondary pipe system 15A of the dust collecting device 14, high temperature steam from the reheating steam pipe system 31 is extracted, the extracted steam is mixed in with the exhaust gas from the outlet of the pressurized fluidized bed boiler 1, and the exhaust gas mixed with the steam is supplied to the gas turbine 15.

In the above-described structure, since the steam extraction pipe system 2 is feeding steam in at the outlet side of dust collecting device 14, the amount of gas passing through the dust collecting device 14 does not change from conventional systems, the temperature at the inlet of the gas turbine 15 decreases to some extent, but the output response of the gas turbine 15 is fast, and the output of the gas turbine 15 increases more than when steam is not extracted. However, in the first embodiment, it is necessary to take care that the gas turbine 15 does not momentarily enter the surging range (25% margin).

In the following, a second embodiment will be explained in greater.

Figure 2:
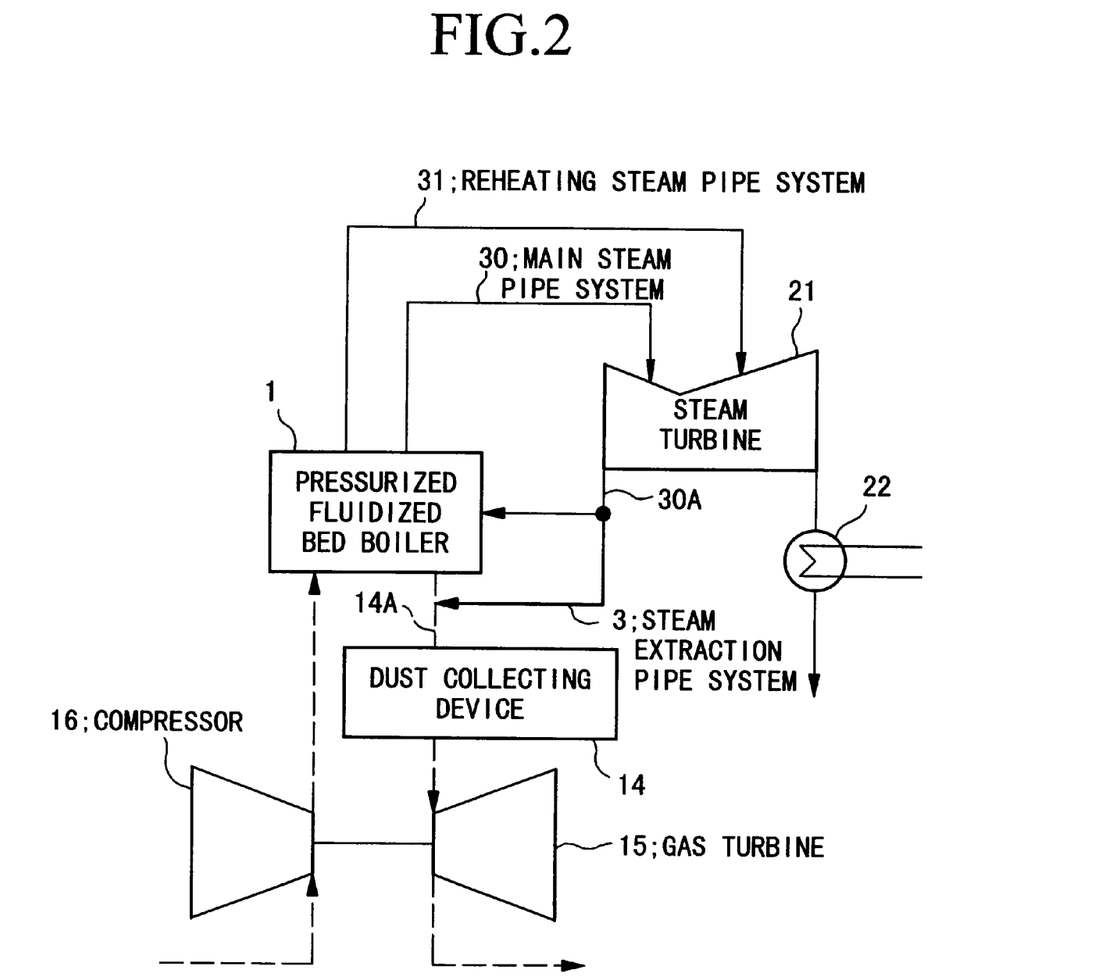
FIG. 2 is a schematic diagram of a combined electricity generation system according to a second embodiment of the present invention.

FIG. 2 is a schematic diagram of a combined electricity generation system according to a second embodiment of the present invention.

In the second embodiment shown in FIG. 2, the point of difference with the first mode shown in FIG. 1 is the provision of steam extraction pipe system 3 in place of steam extraction pipe system 2.

This steam extraction pipe system 3 is provided in a condition connected between the reheating steam pipe system 30A on the low temperature side which returns the low temperature steam which drove the steam turbine 21 by main steam pipe system 30 and the inlet side of pipe system 14A of the dust collecting device 14 between the outlet of the pressurized fluidized bed boiler 1 and the dust collecting device 14, and low temperature reheated steam is extracted from the reheating steam pipe system 30A, that steam is mixed with the exhaust gas of the outlet side of the pressurized fluidized bed boiler 1 and is supplied to the gas turbine 15.

In the above-described structure, since the steam extraction pipe system 3 is feeding steam in at the inlet side of dust collecting device 14, the amount of gas passing through dust collecting device 14 is increased over conventional systems, the temperature of the gas at the inlet of the gas turbine 15 falls by the amount that the temperature of the steam which passes through the dust collecting device 14 falls, and decreases more than that for the first embodiment described above, but the gas turbine output response is as fast as in the above-described first mode and the output of the gas turbine 15, while less than the above-described first mode, does increase. In addition, in the same way as in the first mode, it is necessary to take care that the gas turbine 15 does not momentarily enter the surging range (25% margin).

In the following, a third embodiment will be explained in greater detail.

Figure 3:
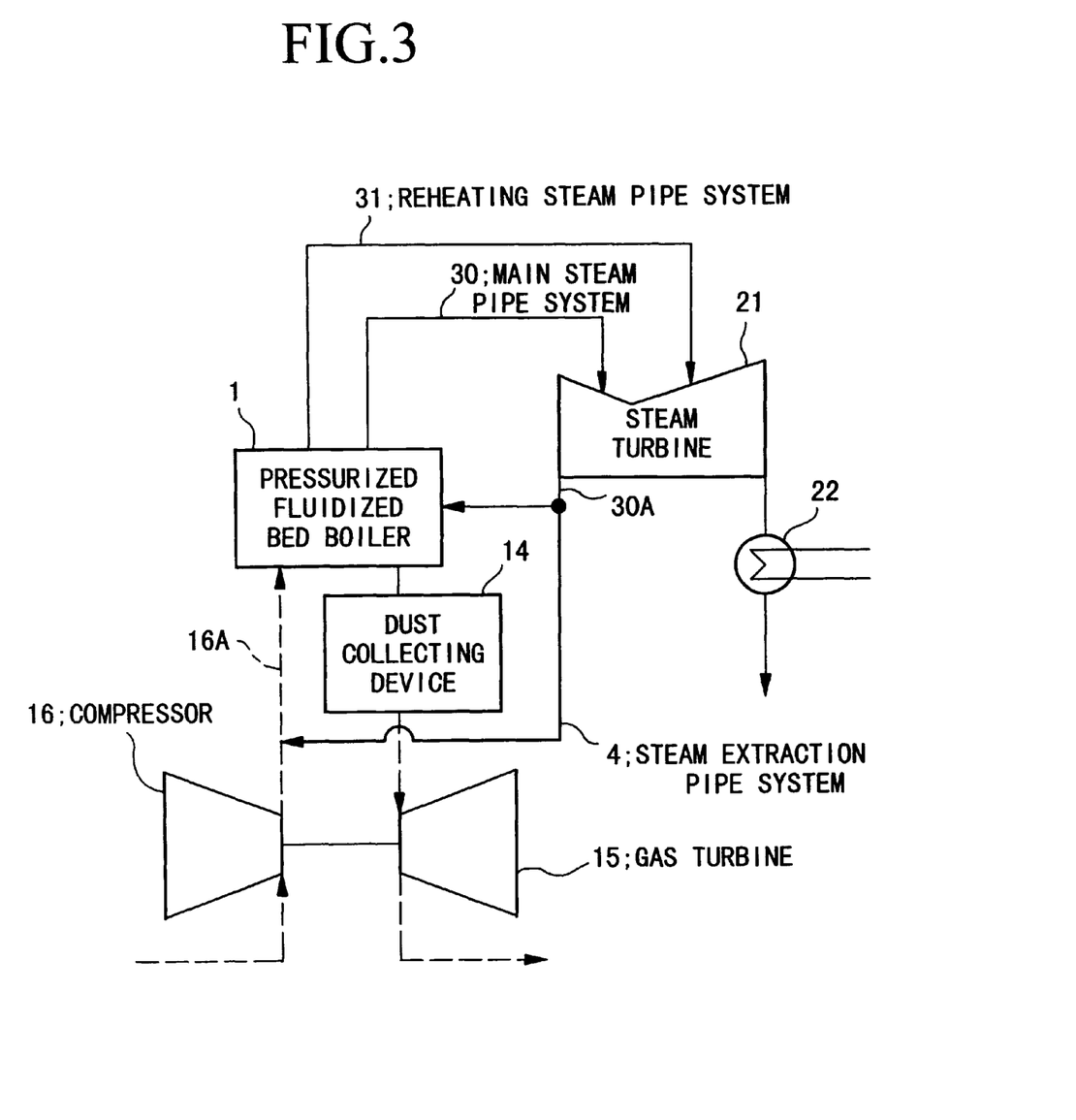
FIG. 3 is a schematic diagram of a combined electricity generation system according to a third embodiment of the present invention.

FIG. 3 is a schematic diagram of a combined electricity generation system according to a third embodiment of the present invention.

In FIG. 3, a point of difference with the above-described first and second modes shown in FIG. 1 and FIG. 2 is that a steam extraction pipe system 4 is provided in place of the steam extraction pipe systems 2 and 3.

This steam extraction pipe system 4 is arranged between the reheating steam pipe system 30A on the low temperature side and an air supply system 16A of the pressurized fluidized bed boiler 1, low temperature reheated steam is extracted, this steam is mixed into the air supply system 16A going to the pressurized fluidized bed boiler 1, and the air mixed with the steam is supplied to the pressurized fluidized bed boiler 1.

Since the steam which is mixed into the air which is supplied to the pressurized fluidized bed boiler 1 is a fluidized bed combusted within the pressurized fluidized bed boiler 1 flows into the dust collecting device 14 together with the exhaust gas, and is supplied to the gas turbine 15, the amount of gas which passes through the dust collecting device 14 is increased by that amount. In addition, since the steam which has been mixed in is heated within the pressurized fluidized bed boiler 1, there is no decrease in temperature and the temperature at the gas turbine inlet does vary from conventional systems. In addition, the output response of the gas turbine 15 is gradual since the mixing is conducted indirectly via the pressurized fluidized bed boiler 1, and increases in output of the gas turbine 15 are larger than those for the above-described first and second modes and are the largest for the present embodiment.

Figure 4:
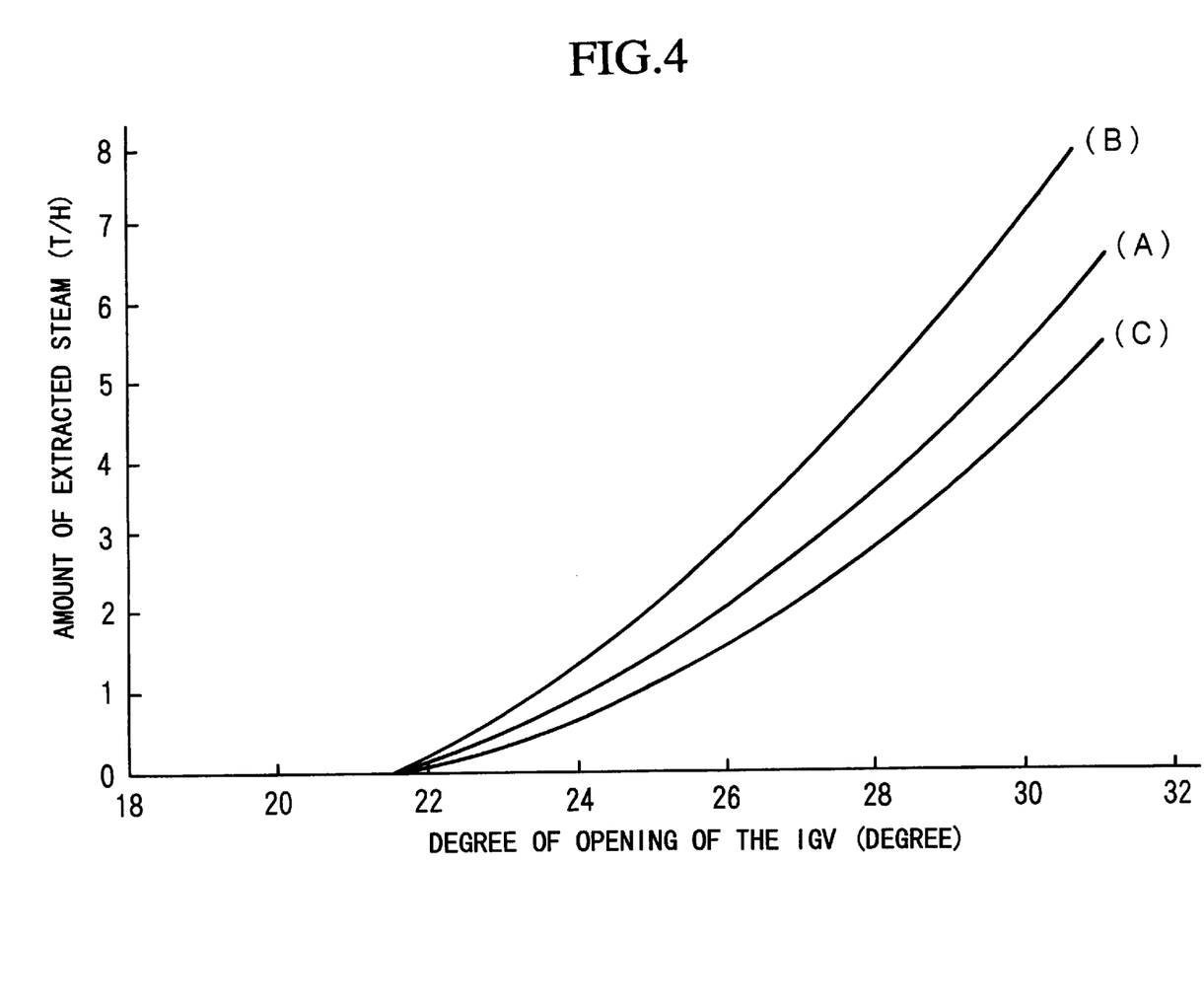
FIG. 4 is a graph showing the quantity of steam necessary for extraction according to a method for increasing the output of the gas turbine according to the first, second and third embodiments of the present invention.

FIG. 4 shows the relationship between the degree of opening of the IGV (inlet variable guide vane) and the amount of steam extracted for each of the first through third embodiment described above. The same amount of air taken in using the compressor (the temperature of the air taken in using the same compressor is determined by the degree of opening of the IGV) is shown on the horizontal axis and the necessary amount of steam extracted from each of the pipe lines which was necessary to obtain the same amount of increase in the output of the gas turbine is shown on the vertical axis, thereby, the relationship between the two is shown. In FIG. 4, the relationship between the amount of air taken in by the same compressor and the necessary amount of steam extracted is shown and (A) represents the first mode shown in FIG. 1, (B) represents the second mode shown in FIG. 2, and (C) represents the third mode shown in FIG. 3.

Here, as can be understood from FIG. 4, the system for which the amount of extracted steam required for the same degree of opening of the IGV was largest for the case of the second embodiment represented by (B), in which steam was extracted from the reheating steam pipe system 30A on the low temperature side and then mixed into the boiler output gas in the inlet side of pipe system 14A on the dust collecting device 14. The second largest was the case represented by (A) in which steam was extracted from the reheating steam pipe system 31 on the high temperature side and mixed into the boiler output gas in the outlet side of pipe system 15A on the dust collecting device 14. The case in which the amount of extracted steam required was the smallest was (C) in which the steam was extracted from the reheating steam pipe system 30A on the low temperature side and fed into the air supply system 16A of the pressurized fluidized bed boiler 1.

In the above-described way, the necessary amount of steam increases in the order of third mode (C), first mode (A), and second mode (B). The reason for this is that, in cases (A) and (B), the gas temperature falls due to the mixing in of extracted steam between pressurized fluidized bed boiler 1 and the inlet of the gas turbine 15, accordingly the gas temperature at the inlet of the gas turbine 15 is reduced, and a phenomenon occurs in which the output increase of the gas turbine 15 declines. On the other hand, in the case of (C), since there is no reduction in gas temperature due to the mixing in of steam between the pressurized fluidized bed boiler 1 and the gas turbine 15, it is the most effective method out of all of the modes.

Here, the reason for the increase in output of the gas turbine 15 due to the extraction and mixing in of steam is that water ($H_2O$) has a high specific heat (among the properties of the gases at the inlet to the gas turbine), and an increase in the gas flow rate is brought about by mixing steam into the gas and, as a result, this brings about the effect of increasing the output of the gas turbine 15.

As mentioned above, in the present invention, steam is mixed into the gas and causes the moisture ($H_2O$) content within the gases at the inlet of the gas turbine 15 to increase and, for the reasons mentioned above, it is possible to increase the output of the gas turbine 15.

In the method of extracting and mixing in steam described above, in the case of the third embodiment, shown by (C), in which steam is extracted from the reheating steam pipe system 30A on the low temperature side and is mixed into the air supply system 16A of the pressurized fluidized bed boiler 1, with regard to rating points, it is possible to expect an increase in the output of the gas turbine of the level of about 150 kw to 200 kw by inserting steam into the air supply system of the boiler.

At partial loads of the plant which occur in the pressurized fluidized bed combined electricity generation system, the temperature of the boiler output gas decreases, consequently, the output increase falls by that amount.

Figure 5:
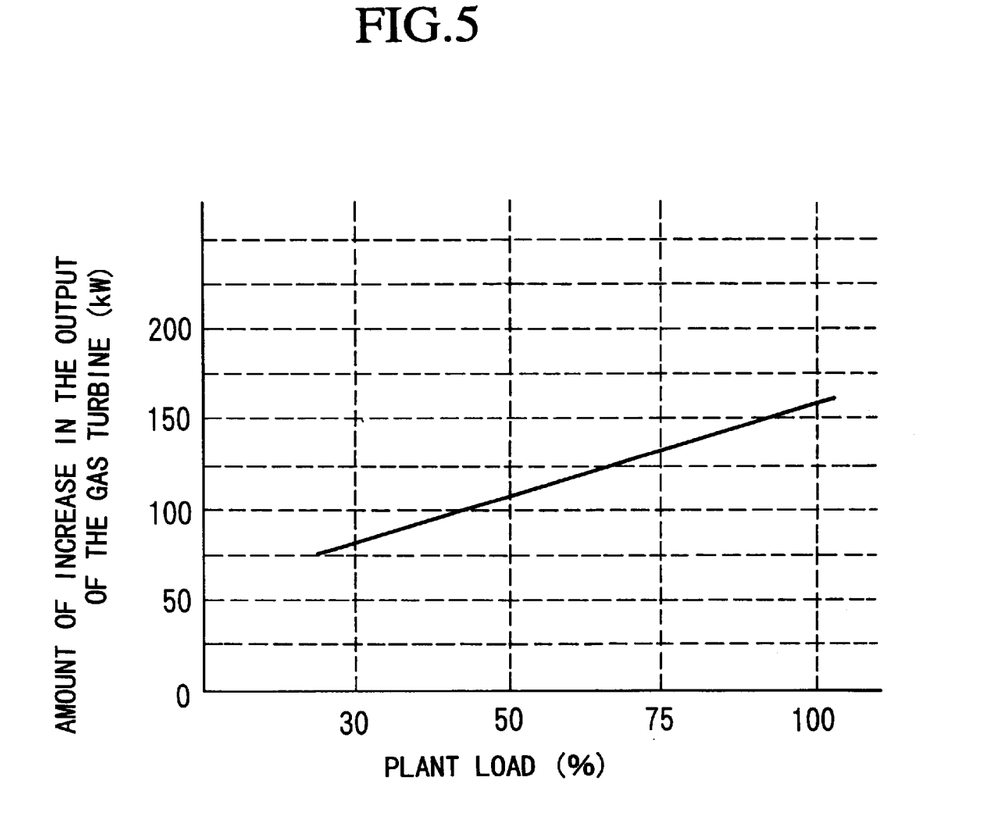
FIG. 5 is a graph showing the relationship between the amount of increase in the output of the gas turbine and the plant load according to the third embodiment of the present invention.

FIG. 5 is a graph showing the amount of increase in the output of the gas turbine at partial loads which occur in the case of the third mode of (C) above. When the plant load is 30%, the amount of output increase is 100 kW or less and, when the plant load is 100%, the output increase is 150 kW or greater.

In addition, in the first, second, and third embodiments, examples of combined electricity generation system which use a pressurized fluidized bed boiler were explained, but the present invention can also be applied to methods of increasing the output of gas turbines of systems in which steam turbines and gas turbines are combined in coal gasification combined electricity generation systems, and the same results are obtained.

In the following, another embodiment of the present invention is explained in detail.

Figure 6:
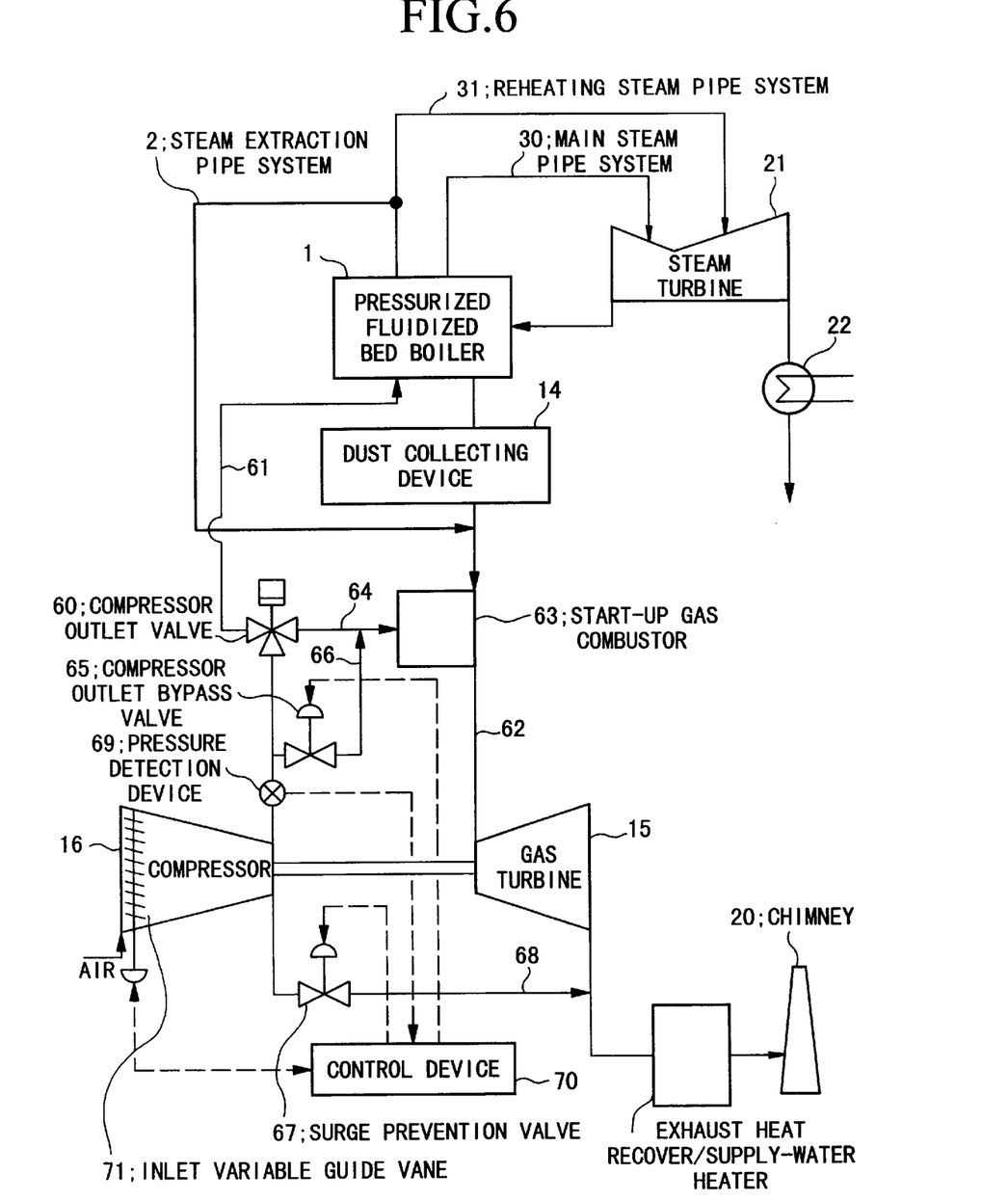
FIG. 6 is a schematic diagram of a combined electricity generation system according to another embodiment of the present invention.

FIG. 6 is a schematic diagram of the pressurized fluidized bed combined electricity generation system according to the present embodiment.

As shown in FIG. 6, the pressurized fluidized bed combined electricity generation system of the present embodiment comprises a pressurized fluidized bed boiler 1, a steam extraction pipe system 2, a dust collecting device 14, a gas turbine 15, a compressor 16, a steam turbine 21, a condenser 22, a main steam pipe system 30, and a reheating steam pipe system 31. These structural elements have generally the same structure as the structural elements having the same references in the pressurized fluidized bed combined electricity generation systems shown in FIG. 1 and FIG. 9.

As shown in FIG. 6, the combined electricity generation system of the present embodiment is a combined electricity generation system in which air from the compressor 16 which is connected to the gas turbine 15 is supplied as air for the pressurized fluidized bed boiler 1. In addition, the combined electricity generation system of the present embodiment has the feature of comprising a bypass pipe (a first bypass duct) 68 which is connected between the outlet side of the compressor 16 and the exhaust gas side of the gas turbine 15 and which has a surge prevention valve (switching valve) 67; a bypass pipe (a second bypass duct) 66 which is connected between the outlet side of the compressor 16 and the inlet side of the gas turbine 15 and which has a compressor outlet bypass valve (switching valve) 65; and a control device 70 which controls the surge prevention valve 67 and the compressor outlet bypass valve 65 (the switching valves of the first and second bypass duct) based on the relationship between the predetermined degree of opening of an inlet variable guide vane 71 of the compressor and surge limiting pressures, and into which measured pressure values from a pressure detection device 69 which measures the pressure at the outlet of the compressor 16 is input.

With regard to the control device 70, two surge limiting pressure values which can be adjusted according to the temperature of the intake air for the compressor 16 are determined in advance. In addition, when the pressure measured during operation by the pressure detection device 69 reaches one of the pressures of the surge limiting pressures, this control device 70 maintains the degree of opening of the inlet variable guide vane 71 and opens the surge prevention valve (the switching valve of the first bypass duct) 67. Additionally, when the other limiting pressure is reached, this control device opens the compressor outlet bypass valve (the switching valve of the second bypass passage)65.

During normal operation, the combined electricity generation system of the present embodiment compresses air via the compressor 16 which is driven by the gas turbine 15, passes it through compressor outlet valve 60, and supplies it as air to the pressurized fluidized bed boiler 1 by duct 61. In addition, during start-up, since the fuel gas from the pressurized fluidized bed boiler 1 is not sufficiently supplied from duct 62a, start-up gas combustor 63 is driven, air from the compressor 16 is supplied to a duct 64 by switching the compressor outlet valve 60, and the gas turbine 15 is driven, thereby, operation is initiated. After the pressurized fluidized bed boiler 1 has been sufficiently heated, the air from the duct 64 is shut off by switching the compressor outlet valve 60, and gas turbine 15 is driven by fuel gas from the pressurized fluidized bed boiler 1.

In the furnace within the pressurized fluidized bed boiler 1, the height of the fluidized bed is varied with respect to variation in load, the heat transfer surface area of the heat transfer pipe within the fluidized bed is increased or decreased, and the amount of steam generated is adjusted.

In FIG. 6, the compressor outlet bypass valve 65 is provided partway along bypass pipe 66 which is arranged between the outlet side of compressor 16 and the duct 64 which is connected to the gas turbine duct on the inlet side of the gas turbine 15. The surge prevention valve 67 is provided partway along the bypass pipe 68 which is connected to the outlet side of the compressor 16 and the exhaust pipe duct of the gas turbine 15.

The pressure detection device 69 measures the pressure at the outlet side of the compressor 16. The control device 70 receives signals for the pressure at the outlet side of the compressor 16 from the pressure detection device 69, and, as explained below, when a value just prior to the occurrence of surging of the compressor 16 is reached, the control device opens the surging prevention valve 67 or the compressor outlet bypass valve 65, and, thereby, controls in such a way as to prevent surging.

Figure 7:
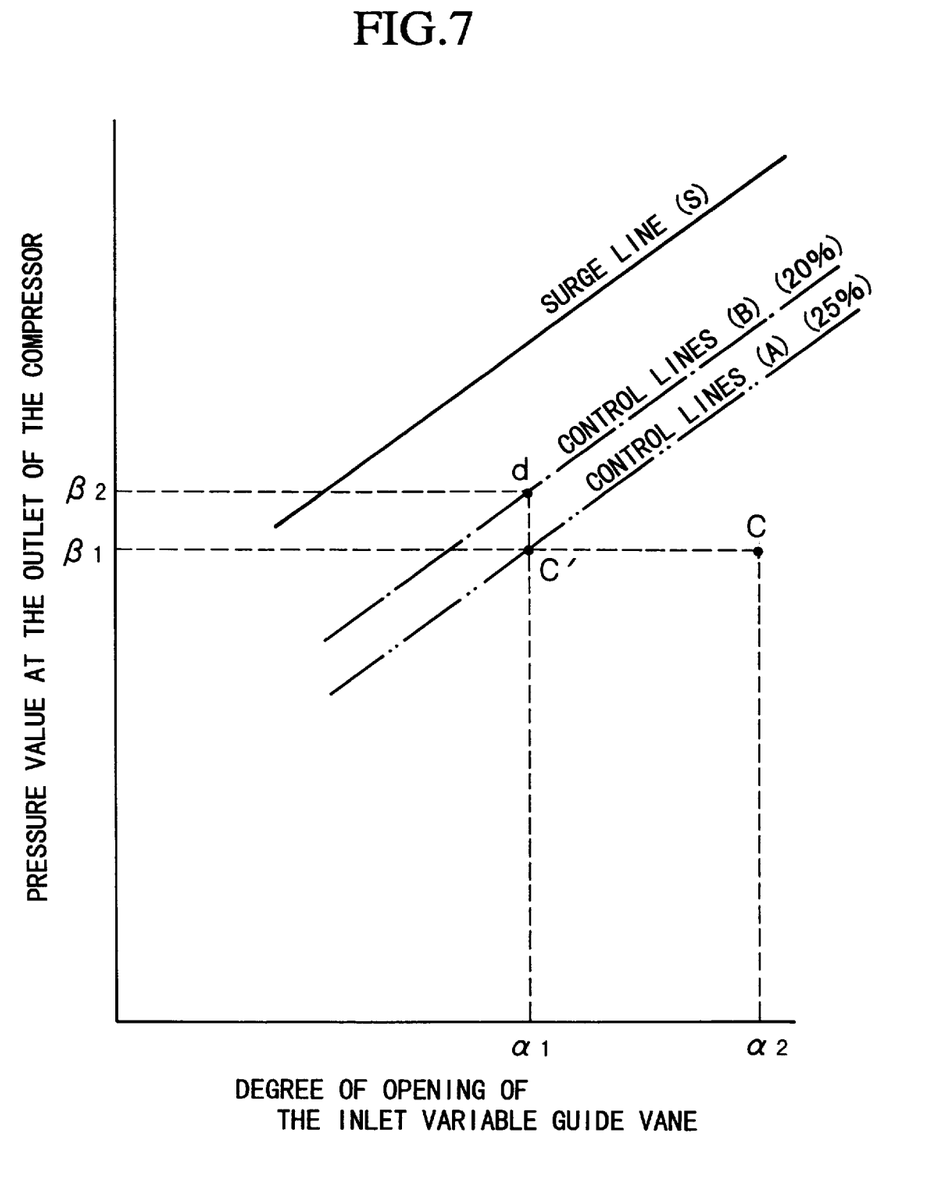
FIG. 7 is a diagram showing the relationship between the degree of opening of the inlet variable guide vane of the inlet of the compressor in the combined electricity generation system according to another embodiment of the present invention.

FIG. 7 is a graph showing the relationship between the compressor outlet pressure and the degree of opening of the inlet variable guide vane 71 of the compressor 16 of the present embodiment.

In FIG. 7, the values of the surge line (S) are known in advance for the compressor 16, and values for pressures 25% lower than the curve of this surge line (S) are the operating limit pressures and form control line (A). Furthermore, values for pressures 20% lower than the values of surge line (S) are set as control line (B). The value data for these control lines (A) and (B) are set in advance in control device 70 and can be controlled in such a way that adjustments are made with respect to the temperature of the intake air of the compressor 16. More specifically, in FIG. 7, when the temperature of the intake air increases, the surge line (S) or the control lines (A) and (B) move downward, and when the temperature of the intake air falls, they move upward, therefore, these types of adjustments can be made by the control device 70.

In FIG. 7, the point C is an operating point and the degree of opening of the inlet variable guide vane 71 there at is $\alpha 2$, when the present load falls and the air flow rate of the compressor 16 falls, if the degree of opening of the inlet variable guide vane 71 is reduced, in the above-described way, since the outlet side of the compressor 16 communicates with the large pressurized container 10, shown in FIG. 9, of the pressurized fluidized bed boiler 1, the pressure does not fall immediately, it is maintained in that condition, and control line (A) is reached at pressure $\beta 1$ for point C' at degree of opening $\alpha 1$.

In the present embodiment, firstly, the pressure $\beta 1$ at the outlet of the compressor 16 for this point C' is measured by pressure detection device 69, and the degree of opening of the inlet variable guide vane 71 are maintained at $\alpha 1$, the surge prevention valve 67 shown in FIG. 6 is opened, and the air at the outlet side of the compressor 16 is allowed to escape from the bypass pipe 68, such that the pressure at the outlet of the compressor 16 does not rise above this point.

The pressure at the above-mentioned point C' is maintained at the point of $\beta 1$, and does not rise, but there are times when high temperature steam is mixed into the air, in this type of situation, additionally, the pressure at the outlet of the compressor 16 rises suddenly. In this type of situation, when the pressure rises to pressure $\beta 2$ at point d, control line (B) is reached, and, in the present embodiment, pressure $\beta 2$ at this point d is measured by the pressure detection device 69, compressor outlet bypass valve 65 shown in FIG. 6 is opened, air on the outlet side of the compressor 16 escapes into the inlet side of the gas turbine 15 from the bypass pipe 66, such that the pressure at the outlet of the compressor 16 does not rise to surge line (S).

Figure 8:
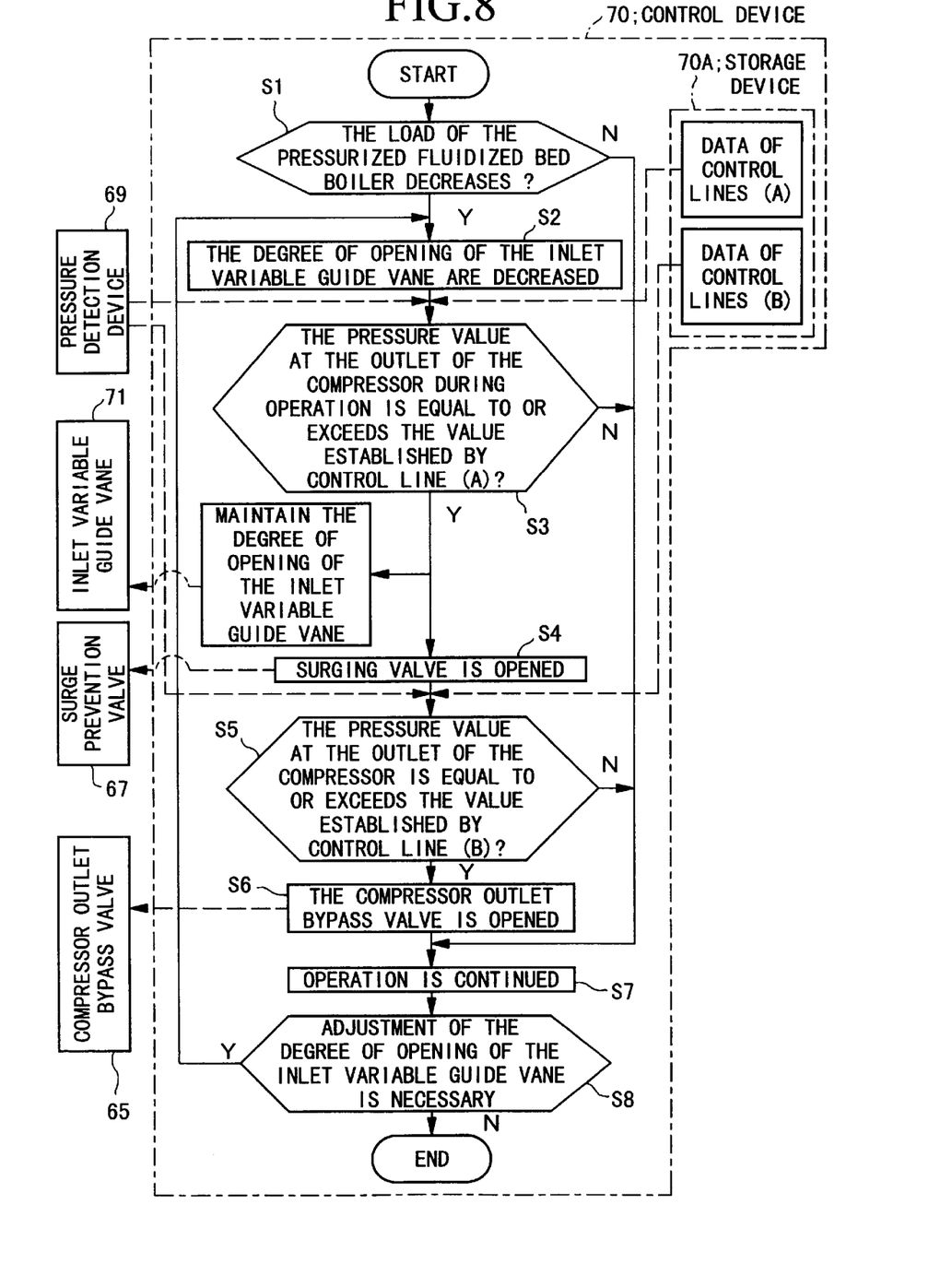
FIG. 8 is a control flow chart for the control apparatus of the combined electricity generation system according to another embodiment of the present invention.

In control device 70, as shown in FIG. 8, a storage device 70A is provided, and data of control lines (A) and (B) like those shown in FIG. 7 are stored in advance in this storage device 70A.

In the pressurized fluidized bed combined electricity generation system, when the load during operation decreases and the degree of opening of inlet variable guide vane 71 is decreased in order to reduce the amount of air in the compressor 16, the pressure at the outlet of compressor 16 during operation is measured by pressure detection device 69, and if this pressure exceeds the stipulated value of control lines (A) and (B) which are set in advance, the control device 70 immediately opens the surge prevention valve 67 or the compressor outlet bypass valve 65 in addition to maintaining the degree of opening of the inlet variable guide vane 71, and prevents a rise in the pressure by allowing an amount of air flowing to the pressurized fluidized bed boiler 1 to bypass, thereby, this control device 70 prevents surging.

In the following, the flow of control of control device 70 is explained in detail.

FIG. 8 is a flow chart of control within the control device 70 which carries out the control explained above.

In FIG. 8, as shown at Step S1, when the load of the pressurized fluidized bed boiler 1 decreases, it is also necessary to decrease the amount of air from the compressor 16, therefore, as shown in Step S2, the degree of opening of the inlet variable guide vane 71 of the compressor is decreased. At that time, as shown in Step S3, the pressure at the outlet of the compressor is measured by the pressure detection device 69, data for the control line (A) is taken in from storage device 70A, and whether or not this measured pressure value is within the specified pressure values is checked. If the measured pressure value is equal to or exceeds the value established by control line (A), as shown in Step S4, surge prevention valve 67 is opened, a quantity of air is allowed to bypass, and surging is prevented. If the measured outlet pressure has not reached the pressure value established by control line (A), operations are continued without change at Step 37.

Next, as shown in Step 54, after the surge prevention valve 67 is opened, as shown in Step S5, data of control line (B) is taken in from storage device 70, and whether or not the pressure at the outlet of the compressor 16 during operation measured by the pressure detection device 69 has reached the pressure value established by this control line (B) is checked, if it has been reached, then the compressor outlet bypass valve 65 is opened as shown in Step S6, and the air flow is again allowed to bypass, and surging is prevented. If the pressure value established by control line (B) is not reached, operation is continued without change as shown in Step S7.

At Step S7, after the processing of each of Steps S1, S3, S5 and S6, operation is continued, and as shown in Step S8, if adjustment of the degree of opening of the inlet variable guide vane 71 is necessary, Step S2 is returned to, if this is not necessary, processing is completed. When control device 70 reduces the degree of opening of the inlet variable guide vane 71 in this way, the pressure at the outlet of compressor 16 does not decrease and approaches surge line (S), at the time it reaches control line (A), the degree of opening of the inlet variable guide vane 71 is maintained, surge prevention valve 67 or compressor outlet bypass valve 65 is opened, and an amount of air flowing from the outlet side of compressor 16 is allowed to bypass, and surging of the compressor 16 is prevented.

Of course, in addition to the effects mentioned above, the same effects as for the second embodiment are obtained.

What is claimed is:

1. A pressurized fluidized bed combined electricity generation system comprising:

a steam turbine;

a pressurized fluidized bed boiler for generating steam for supply to said steam turbine via a main steam pipe system by combusting air and fuel;

a dust collecting device connected to said pressurized fluidized bed boiler;

a gas turbine connected to said dust collecting device via a secondary pipe system and driven by exhaust gas supplied through the dust collecting device from said pressurized fluidized bed boiler and air from a compressor;

a reheating steam pipe system connected between the pressurized fluidized bed boiler and the steam turbine; and a steam extraction pipe system wherein a part of the steam generated by said pressurized fluidized bed boiler is extracted from the reheating steam pipe system and is supplied to said gas turbine via the secondary pipe system;

wherein steam supplied to said gas turbine is mixed with said exhaust gas.

2. A pressurized fluidized bed combined electricity generation system according to claim 1, further comprising:

a first bypass duct which communicates between an outlet side of the compressor and an exhaust gas side of said gas turbine and which has a surge prevention valve;

a second bypass duct which communicates between the outlet side of said compressor and an inlet side of said gas turbine and which has a compressor outlet bypass valve; and a control device which receives measured pressure values from a pressure detection device which detects the pressure at the outlet side of the compressor and which controls said valves of said first and second bypass ducts based on a relationship between a surge limiting pressure and a predetermined degree of opening of an inlet variable guide vane of the compressor;

wherein air from said compressor which is connected to said gas turbine is supplied as the air for combustion in said pressurized fluidized bed boiler.

3. A pressurized fluidized bed combined electricity generation system according to claim 2, wherein steam supplied to said gas turbine is mixed into said air from said compressor.

4. A pressurized fluidized bed combined electricity generation system according to claim 2, wherein:

two surge limiting pressure values are established in said control device in advance and, when a pressure during operation measured by said pressure detector reaches a pressure of one of said surge limiting pressure values, said control device maintains the predetermined degree of opening of the inlet variable guide vane and opens the surge prevention valve of the first bypass duct and, when said pressure during operation reaches the other surge limiting pressure value, said control device opens the outlet bypass valve of the second bypass duct.

5. A pressurized fluidized bed combined electricity generation system according to claim 4, wherein said control device is able to adjust the values of said two surge limiting pressures established in advance depending the temperature of the intake air of said compressor.

* * * * *